US 7,769,270 B2

(12) United States Patent
Nakamura et al.

(10) Patent No.: US 7,769,270 B2
(45) Date of Patent: Aug. 3, 2010

(54) EDITING SYSTEM AND CONTROL METHOD THEREOF

(75) Inventors: Nobuo Nakamura, Kanagawa (JP); Fumio Shimizu, Kanagawa (JP); Hideaki Miyauchi, Tokyo (JP); Takeshi Kawamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 1563 days.

(21) Appl. No.: 10/899,180

(22) Filed: Jul. 26, 2004

(65) Prior Publication Data

US 2005/0025454 A1 Feb. 3, 2005

(30) Foreign Application Priority Data

Jul. 28, 2003 (JP) ............................ P2003-281141

(51) Int. Cl.
*G11B 27/00* (2006.01)
*H04N 5/93* (2006.01)

(52) U.S. Cl. ........................... 386/55; 386/52; 386/53

(58) Field of Classification Search ................... 386/52, 386/55

See application file for complete search history.

(56) References Cited

U.S. PATENT DOCUMENTS

| 6,211,869 | B1 | 4/2001 | Loveman et al. |
| 6,381,608 | B1 * | 4/2002 | Savoie .................... 707/102 |
| 6,535,686 | B1 | 3/2003 | Yanase et al. |
| 2001/0052909 | A1 * | 12/2001 | Kumagai et al. ............ 345/723 |
| 2002/0145622 | A1 | 10/2002 | Kauffman et al. |

FOREIGN PATENT DOCUMENTS

| EP | 1 126 695 | 8/2001 |
| JP | 11 66816 | 3/1999 |
| JP | 11 88821 | 3/1999 |
| JP | 2001 238193 | 8/2001 |

* cited by examiner

*Primary Examiner*—Thai Tran
*Assistant Examiner*—Girumsew Wendmagegn
(74) *Attorney, Agent, or Firm*—Frommer, Lawrence & Haug LLP; William S. Frommer; Thomas F. Presson

(57) ABSTRACT

This invention realizes an editing system and control method thereof capable of significantly improving working efficiency of editing work. A proxy editing terminal device creates an EDL with low-resolution video/audio data, resulting in reducing time to create the EDL. Further, the low-resolution video/audio data and high-resolution video/audio data having the same contents and different resolutions are previously stored, so that the creation of a final edit list with the high-resolution video/audio data based on the EDL can be started in a short time after the EDL is created with the low-resolution video/audio data. Thus working efficiency of the editing work can be significantly reduced with reducing time to create the EDL and the final edit list.

14 Claims, 14 Drawing Sheets

EDITING SYSTEM AND CONTROL METHOD THEREOF

BACKGROUND OF THE INVENTION

1. Field of the Invention

This invention relates to an editing system and a control method thereof and, more particularly, is suitably applied to an on-air system which is used in a television broadcasting station, for example.

2. Description of the Related Art

With an editing device which is used in an on-air system, we can create an edit list specifying edit details describing which clip and which clip are to be connected to create edited video and audio while visually confirming the video of desired video/audio material (hereinafter, referred to as clip). Then by processing and editing the video/audio data of specified clips based on the created edit list, edited video/audio based on the edit list can be created (for example, Japanese Patent Application Laid-Open No. 11-66816).

By the way, conventionally, to create such an edit list, an edit list (hereinafter, referred to as Edit Decision List (EDL)) is first created, which specifies edit details for only cut editing indicating which parts of which clips are connected in what order. Then based on the EDL, a final edit list is created by fine-adjusting desired parts of the connected clips and setting special effects.

In this case, the editing device reads high-resolution video/audio data for on-air corresponding to required clips, from an AV server of a large capacity storing various clips obtained through coverage, etc., and creates an EDL and a final edit list by using the data.

Actually, the creation of an EDL does not require high-resolution video/audio data because the EDL just specifies cut editing, i.e., which parts of which clips are connected in what order.

However, in such an editing device, if video/audio data to be used for the creation of an EDL and video/audio data to be used for the creation of a final edit list do not have the same resolution, the final edit list cannot be created based on the EDL.

Therefore, to create the final edit list which requires high-resolution video/audio data for on-air, the high-resolution video/audio data for on-air of a large amount should be used for the creation of the EDL as well, which arises a problem in that it take a lot of time to create the EDL.

SUMMARY OF THE INVENTION

This invention has been made in view of foregoing and proposes to an editing system and control method thereof capable of significantly improving working efficiency of editing work.

To solve the problems, this invention provides an editing system with: a first storage and retaining means for storing and retaining the high-resolution video data of edit material; a second storage and retaining means for storing and retaining the low-resolution video data of the edit material; a first edit list creation means for creating a first edit list specifying edit details for rough editing, by using the low-resolution video data; a second edit list creation means for creating a second edit list specifying the edit details of actual editing, by using the high-resolution video data; and a network for connecting the first edit list creation means and the second edit list creation means. The second edit list creation means reads the first edit list from the first edit list creation means over the network, so as to create the second edit list based on the first edit list.

Therefore, in this editing system, the low-resolution video data is used to create the first edit list, which reduces time to create the first edit list. Further, since the low-resolution video data and the high-resolution video data of the edit material are stored and retained, the creation of the second edit list with the high-resolution video data can be started in a short time after the first edit list is created by using the low-resolution video data, thus making it possible to realize an editing system capable of significantly improving working efficiency of editing work with reducing time to create the first and second edit lists.

In addition, this invention provides a control method of an editing system with: a first step of storing and retaining the high-resolution video data of edit material in a first storage and retaining means; a second step of storing and retaining the low-resolution video data of the edit material in a second storage and retaining means; a third step of creating a first edit list specifying edit details for rough editing by using the low-resolution video data in a first edit list creation means; and a fourth step of reading the first edit list from the first edit list creation means over a network and creating a second edit list specifying the edit details of actual editing by using the high-resolution video data based on the first edit list in a second edit list creation means.

Therefore, in this control method of the editing system, the low-resolution video data is used to create the first edit list, which can reduce time to create the first edit list. In addition, since the low-resolution video data and high-resolution video data of the edit material are stored and retained, the creation of the second edit list with the high-resolution video data can be started in a short time after the first edit list is created with the low-resolution video data, thus making it possible to realize a control method of an editing system capable of significantly improving working efficiency of editing work with reducing time to create the first and second edit lists.

The nature, principle and utility of the invention will become more apparent from the following detailed description when read in conjunction with the accompanying drawings in which like parts are designated by like reference numerals or characters.

DETAILED DESCRIPTION OF THE DRAWINGS

DETAILED DESCRIPTION OF THE EMBODIMENT

Preferred embodiments of this invention will be hereinafter described with reference to accompanying drawings:

(1) Construction of On-Air System According to this Embodiment

Figure 1:
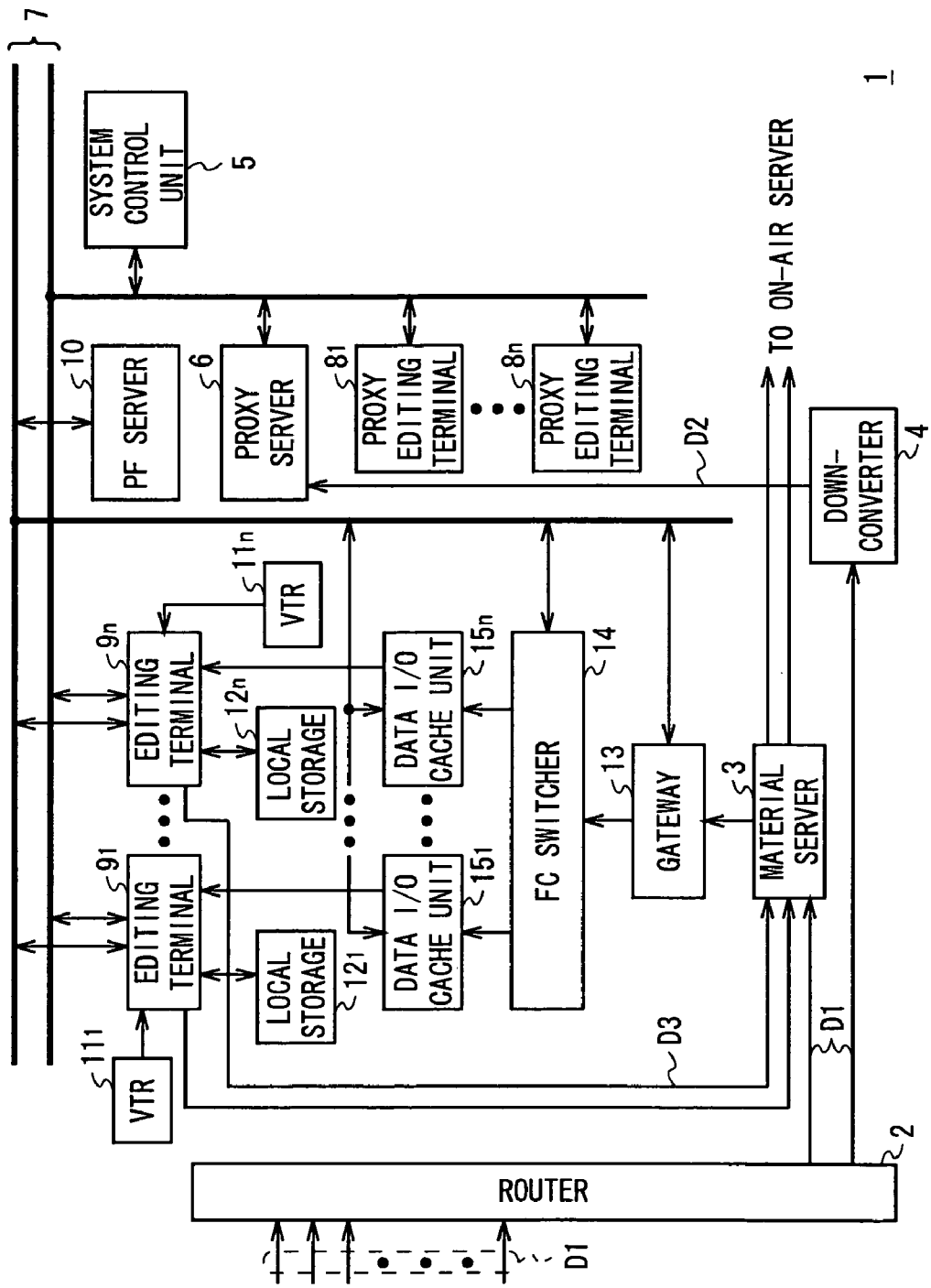
FIG. 1 is a block diagram showing an entire construction of an on-air system according to this embodiment.

Referring to FIG. 1, reference numeral 1 shows an on-air system of this embodiment which is installed in a television broadcasting station or the like. Video/audio data (hereinafter, referred to as high-resolution video/audio data) D1 of resolution of 140 Mbps in an HDCAM (trademark of Sony Corporation) format is entered to a material server 3 and a down-converter 4 via a router 2, the video/audio data D1 being transferred from a coverage site via a satellite communication circuit and the like or being reproduced from a coverage tape by a video tape recorder.

The material server 3 comprises an AV server of a large capacity composed of a plurality of Redundant Arrays of Independent Disks (RAID), and stores a series of the high-resolution video/audio data D1 received via the router 2, in a form of a file under the control of a system control unit 5 comprising a personal computer.

The down-converter 4, on the other hand, converts the received high-resolution video/audio data D1 down to data of resolution of about 8 Mbps, compresses and encodes the resultant with the Motion Picture Experts Group (MPEG) format, and sends the obtained low-resolution video/audio data D2 to a proxy server 6.

Similarly to the material server 3, the proxy server 6 comprises an AV server composed of a plurality of RAIDs, and stores a series of low-resolution video/audio data D2 received from the down-converter 4, in a form of a file under the control of the system control unit 5. In this way, this on-air system 1 records in the proxy server 6 low-resolution clips having the same contents as clips recorded in the material server 3.

Then the low-resolution video/audio data D2 of clips being stored in the proxy server 6 can be read by using a desired proxy editing terminal device $8_1$ to $8_n$ or editing terminal device $9_1$ to $9_n$ being connected to the proxy server 6 via an Ethernet (trademark) 7. Then by using this data D2, the proxy editing terminal device $8_1$ to $8_n$ can create an EDL specifying edit details for only cut editing, i.e., which clips out of clips being stored in the material server 3 are to be connected in what order to create processed and edited video and audio (hereinafter, edited video and audio).

In actual, in an EDL creation mode realized by running software dedicated to the EDL creation, when an operator selects one clip out of the clips being stored in the proxy server 6 and enters its playback command, a proxy editing terminal device 81 to 8, accesses the system control unit 5 via the Ethernet 7 and controls the proxy server 6 via the system control unit 5 so as to make the proxy server 6 read the low-resolution video/audio data D2 of the clip.

The proxy editing terminal device $8_1$ to $8_n$ decodes the low-resolution video/audio data D2 read from the proxy server 6, and displays video based on the video/audio data of thus obtained baseband on a display. As a result, the operator can create an EDL which is an edit list for only cut editing while visually confirming the video being displayed on the display.

The EDL data which is the data of thus created EDL can be transferred to a desired editing terminal device $9_1$ to $9_n$ via the Ethernet 7 from the proxy editing terminal device $8_1$ to $8_n$ according to operator's operation. The transferred EDL data is stored and managed by this editing terminal device $9_1$ to $9_n$ thereafter.

On the other hand, the editing terminal devices $9_1$ to $9_n$ each comprises a nonlinear editing device with a video board capable of applying special effects to the high-resolution video/audio data D1 in real time. In an edit list creation mode realized by running dedicated software, when the operator selects one clip out of clips being stored in the proxy server 6 and enters its playback command, the editing terminal device $9_1$ to $9_n$ controls the proxy server 6 via the system control unit 5, so as to display the low-resolution video of the clip on the display, as in the case of the proxy editing terminal devices $8_1$ to $8_n$.

Thus, while visually confirming this video, the operator can create a final edit list including setting of video special effects and audio mixing, newly or by using an EDL created with a proxy editing terminal device $8_1$ to $8_n$.

Note that vide tape recorders $11_1$ to $11_n$ and local storage units $12_1$ to $12_n$ such as hard disk drives are connected to the editing terminal devices $9_1$ to $9_n$, respectively, so that video/audio material being recorded on video tapes or the like can be taken in the local storage units $12_1$ to $12_n$ as clips via the video tape recorders $11_1$ to $11_n$ and used for editing.

In addition, during the creation of an edit list, every time when an IN-point and an OUT-point of a desired video/audio part in one clip are specified and arranged on a time line, the editing terminal device $9_1$ to $9_n$ accesses the system control unit 5 via the Ethernet 7 and controls the material server 3 via the system control unit 5 so as to sequentially read the high-resolution video/audio data D1 of the video/audio part being arranged on the time line.

Then this high-resolution video/audio data D1 is converted into a prescribed format via a gateway 13 under the control of the system control unit 5, and then is given and stored via a fiber channel switcher 14 in a corresponding data I/O cache unit $15_1$ to $15_n$ which comprises a semiconductor memory of a storage capacity of 180 Giga bytes.

When the operator enters a playback (preview) command for the high-resolution video based on the edit list thereafter, the editing terminal device $9_1$ to $9_n$ reads the required high-resolution video/audio data D1 from the corresponding data I/O cache unit $15_1$ to $15_n$, creates edited video with the high-resolution video/audio data D1, and displays the video on the display.

When the operator finishes to create the edit list and enters a command to execute this edit list, the editing terminal device $9_1$ to $9_n$ sequentially reads the corresponding high-resolution video/audio data D1 from the data I/O cache unit $15_1$ to $15_n$ based on the edit list, applies, if required, special effects and audio mixing to the high-resolution video/audio data D1, and sends thus obtained edited video/audio data D3 to the material server 3. As a result, this edited video/audio data D3 is recorded in the material server 3 in a form of a file under the control of the system control unit 5.

Further, the edited video/audio data D3 recorded in this material server 3 is transferred to an on-air server not shown, according to operator's operation, and is read from the on-air server according to a so-called play list which is created by a program producer for broadcasting.

As described above, with this on-air system 1, a procedure from editing to on-air of edited video/audio obtained by the editing can be efficiently performed.

(2) Construction of Proxy Editing Terminal Device

Figure 2:
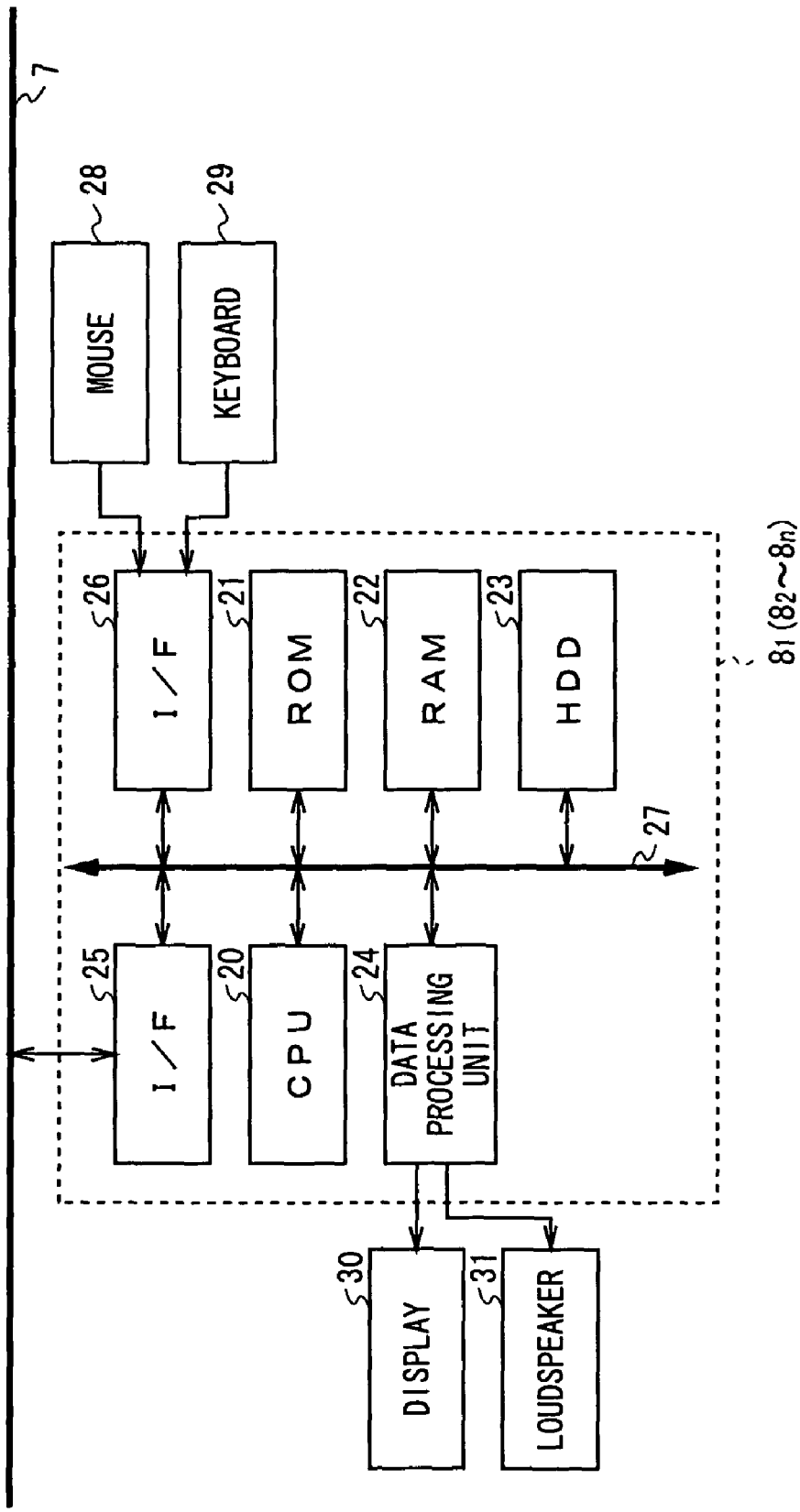
FIG. 2 is a block diagram showing a construction of a proxy editing terminal device.

Referring to FIG. 2, the proxy editing terminal devices $8_1$ to $8_n$ are each composed of a Central Processing Unit (CPU) 20, a Read Only Memory (ROM) 21 storing various programs and parameters, a Random Access Memory (RAM) 22 serving as a work memory of the CPU 20, a hard disk drive 23 storing various software, a data processing unit 24 having various video data processing functions and audio data processing functions, and interfaces 25 and 26, which are connected via a CPU bus 27, and is connected to the Ethernet 7 via the interface 25.

In addition, input devices such as a mouse 28 and a keyboard 29 are connected to the interface 26, and a display 30 and a loudspeaker 31 are connected to the data processing unit 24.

The CPU 20 reads screen data from the hard disk drive 23 according to necessity, and gives this to the data processing unit 24, thereby displaying various screens and windows on the display 30, which will be described later.

In addition, the CPU 20 sends a command to the system control unit 5 (FIG. 1) via the interface 25 and the Ethernet 7 according to necessity, thereby making the proxy server 6 (FIG. 1) be in a desired state, via the system control unit 5.

As a result, for example, the CPU 20 takes in the low-resolution video/audio data D2 of a clip specified by the operator, which is transferred from the proxy server 6 via the Ethernet 7, via the interface 25, and gives this to the data processing unit 24, thereby displaying the video based on the low-resolution video/audio data D2 at a prescribed position on a corresponding screen or window.

Further, when a cut editing command for the low-resolution video/audio data D2 is entered via the mouse 28 or the keyboard 29, the CPU 20 controls the data processing unit 24 according to the cut editing command to perform the requested cut editing on the low-resolution video/audio data D2, and then outputs the resultant video and audio from the display 30 and the loudspeaker 31.

(3) EDL Creation Procedure in Proxy Editing Terminal Device $8_1$ to $8_n$

The EDL creation procedure in the proxy editing terminal devices $8_1$ to $8_n$ will be now described.

Each proxy editing terminal device $8_1$ to $8_n$ is designed to be capable of creating an EDL by performing cut editing in which desired video/audio parts of desired clips being recorded in the proxy server 6 are specified and a sending order of the cut video is set by arranging these parts on a time line.

Figure 3:
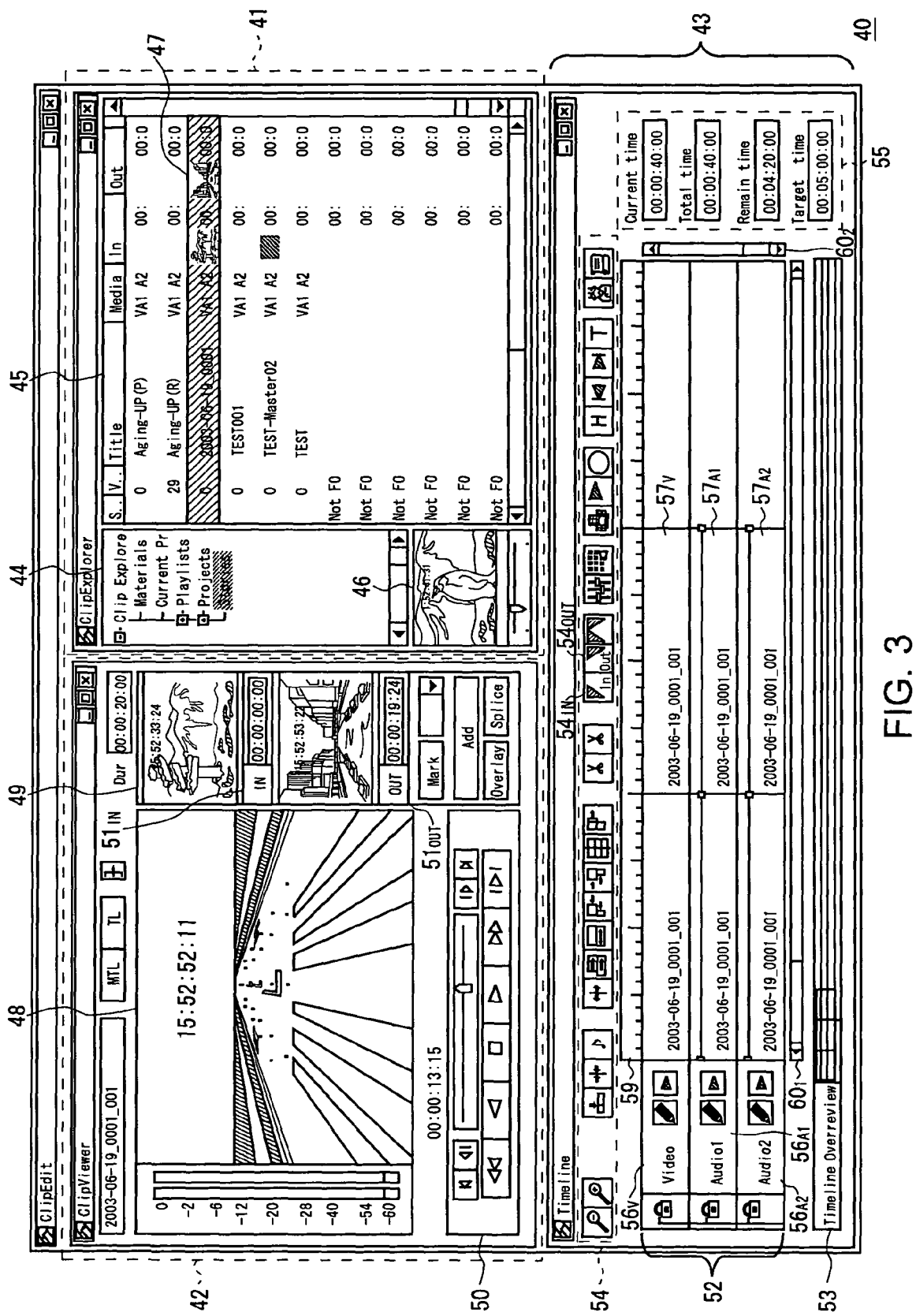
FIG. 3 is a schematic diagram showing an EDL creation screen.

In actual, to create an EDL, the operator runs corresponding software to display an EDL creation screen 40 as shown in FIG. 3 on the display 30 (FIG. 2).

This EDL creation screen 40 is composed of a clip explorer window 41, a clip viewer window 42, and a time line window 43.

The clip explorer window 41 is a window to display a list of clips read from the proxy server 6, and is composed of a tree display part 44, a clip list display part 45 and a preview display part 46.

The tree display part 44 of the clip explorer window 41 shows the storage locations (folders or the like) of clips read from the proxy server 6 in a form of a tree. The clip list display part 45 shows management information (clip name, IN-point and OUT-point) on each clip belonging to a folder being selected in the tree display part 44. When the operator clicks the management information on a desired clip out of the management information being displayed in the clip list display part 45, the management information of the clip is selected by a select cursor 47. The preview display part 46 of the clip explorer window 41 displays the preview video of a clip being selected in the clip list display part 45.

The clip viewer window 42 is a window for extracting a desired part as a cut while allowing the video of a clip selected on the clip explorer window 41 to be visually confirmed, and is composed of a clip video display part 48, a cut specifying part 49 and playback command buttons 50.

After selecting a desired clip on the clip explorer window 41 and moving the select cursor 47 onto the clip viewer window 42 by drug and drop, the operator can extract a desired part of the clip as a cut.

The clip video display part 48 of the clip viewer window 42 displays the video of a clip moved from the clip explorer window 41, and playbacks the video according to operation of the playback command buttons 50. In addition, the cut specifying part 49 has an IN-point specifying button $51_{IN}$ and an OUT-point specifying button $51_{OUT}$ to specifying an IN-point and an OUT-point of the clip, and displays the times of the IN-point and OUT-point and the images of the times.

The operator can specify an IN-point and an OUT-point of a clip with the IN-point specifying button $51_{IN}$ and OUT-point specifying button $51_{OUT}$ of the cut specifying part 49 by operating the playback command buttons 50 while visually confirming the video of the clip being displayed in the video display part 48. Thus the operator can extract a desired part of a desired clip as a cut.

When a desired part of a clip is specified as a cut on the clip viewer window 42 as described above, this clip is pasted on the time line window 43. By repeating the above processes, plural clips can be arranged on the time line window 43.

The time line window 43 is composed of a time line 52, a time line overview 53, a cut editing icon group 54, and a set time display part 55.

The time line 52 of this time line window 43 is provided with a video track $56_V$ and audio tracks $56_{A1}$ .... On the video track $56_V$ and the audio tracks $56_{A1}$ ..., a colored area $57_V$ and colored areas $57_{A1}$ ... each having the length of cut video of a clip or cut audio accompanied with the cut video are provided along a time scale 59.

FIG. 3 shows a case where a clip pasted on the time line window 43 is composed of one cut video and two cut audio accompanied with the cut video. Therefore, the colored area $57_V$ indicating the cut video and the colored areas $57_{A1}$ and $57_{A2}$ indicating the cut audio are shown on the time line 52. Note that the time line 52 shows just part of the entire time line at a time. The other part of the time line can be displayed by sliding slide bars $60_1$ and $60_2$.

Further, a reduced time line is displayed in the time line overview 53, which allows the operator to visually confirm the entire time line.

The cut editing icon group 54, on the other hand, is provided with icons for cut editing allowing cut editing commands to be entered easily. For example, even on the time line window 43, an IN-point and an OUT-point can be specified by clicking an IN-point specifying icon $54_{IN}$ and an OUT-point specifying icon $54_{OUT}$. The set time display part 55 displays the total time of the entire time line and the remaining time.

The operator operates the cut editing icons of the cut editing icon group 54 and moves the colored areas $57_V$, $57_{A1}$ and $57_{A2}$ to desired positions with the mouse 28 while visually confirming the colored area $57_V$ and the colored areas $57_{A1}$ and $57_{A2}$ being displayed in the time line 52, in order to perform the cut editing to connect cuts, as desired, thereby creating an EDL based on the cut editing.

Thus with the proxy editing terminal device, the operator can perform desired cut editing on the EDL creation screen 40 and create an EDL based on the cut editing.

(4) Construction of Editing Terminal Device $9_1$ to $9_n$

Figure 4:
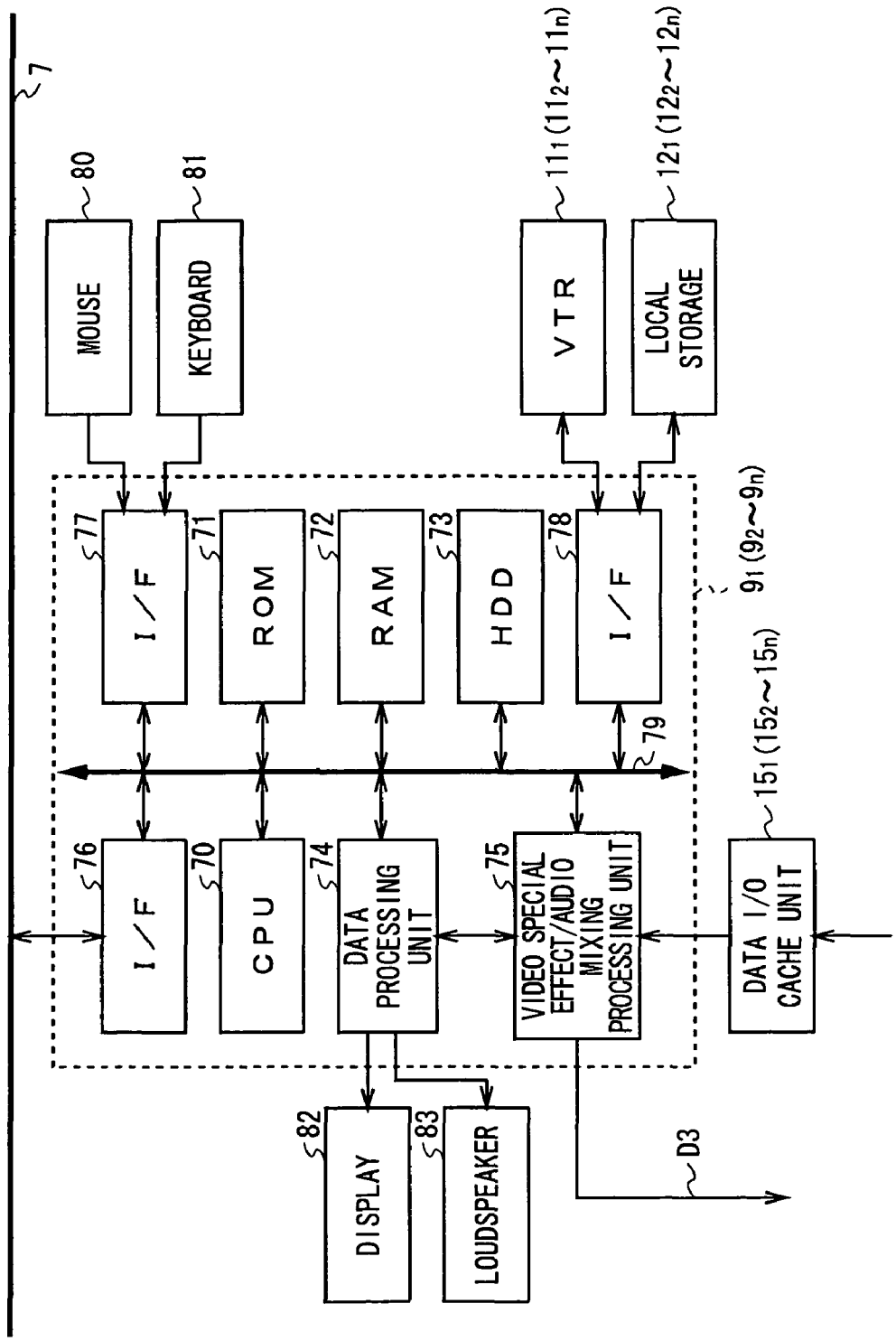
FIG. 4 is a block diagram showing a construction of an editing terminal device.

Referring to FIG. 4, the editing terminal devices $9_1$ to $9_n$ are each composed of a central processing unit (CPU) 70, a Read Only Memory (ROM) 71, a Random Access Memory (RAM) 72, a hard disk drive 73 storing various software, a data processing unit 74 with various video data processing functions and audio data processing functions, a video special effect/audio mixing processing unit 75 for applying specified video special effects and audio mixing to high-resolution video/audio data D1, and various interfaces 76 to 78, which are connected with a CPU bus 79, and is connected to the Ethernet 7 via the interface 76.

In addition, input devices such as a mouse 80 and a keyboard 81 are connected to the interface 77, and the video tape recorders $11_1$ to $11_n$ and the local storage units $12_1$ to $12_n$ are connected to the interface 78. Connected to the data processing unit 74 are a display 82 and a loudspeaker 83.

The CPU 70 reads screen data from the hard disk drive 73, according to necessity, and gives it to the data processing unit, thereby displaying various windows and dialogs on the display 82, which will be described later.

In addition, the CPU 70 sends a command to the system control unit 5 (FIG. 1) via the interface 76 and the Ethernet 7 according to necessity, so as to control the material server 3 (FIG. 1), the proxy server 6 (FIG. 1), the FC switcher 14 (FIG. 1), and the data I/O cache units $15_1$ to $15_n$ (FIG. 1) via the system control unit 5 to make them be in desired states.

As a result, for example, the CPU 70 takes in the low-resolution video/audio data D2 of a clip specified by the operator via the interface 76, which is transferred from the proxy server 6 via the Ethernet 7, and gives this to the data processing unit 74, thereby displaying the video based on the low-resolution video/audio data D2 at a prescribed position on a corresponding window or dialog.

Further, the CPU 70 controls the video special effect/audio mixing processing unit 75 according to necessity, so as to make this unit 75 read high-resolution video/audio data D1 from the corresponding data I/O cache unit $15_1$ to $15_n$ and apply special effects and audio mixing to the high-resolution video/audio data D1 according to necessity.

Thus obtained edited video/audio data D3 is given to the data processing unit 74, thereby displaying on the display 82 the edited video, which has been subjected to the special effects, and outputting from the loudspeaker 83 the edited audio, which has been subjected to the audio mixing, on the basis of the edited video/audio data D3.

Further, the CPU 70 controls the video special effect/audio mixing processing unit 75 according to necessity, to send the edited video/audio data D3 to the material server 3, and controls the material server 3 via the system control unit 5 to store this edited video/audio data D3, resulting in registering the edited video/audio data D3 in the material server 3.

(5) Edit List Creation Procedure in Editing Terminal Device $9_1$ to $9_n$

The edit list creation procedure in the editing terminal devices $9_1$ to $9_n$ will be now described.

Each editing terminal device $9_1$ to $9_n$ creates a final edit list by specifying desired video/audio parts of desired clips being recorded in the material server 3, setting a sending order of cut video by arranging the parts on a time line, and applying video special effects and audio mixing and inserting a title.

Information (EDL information) on thus created edit list, such as the time codes of IN-point and OUT-point of each cut, the arrangement order of the cuts, the name of the edit list, the creator and the creation date and time, information on the video special effects and audio mixing set in this edit list, and various information on working environments at a time of creating the edit list are stored in one file and managed as "project".

Therefore, a new project should be created when a new edit list is created. In this case, the operator runs corresponding software to display a project manager window 90 shown in FIG. 5 on the display 82 (FIG. 4).

This project manager window 90 is a window to manage and view projects, and is composed of a tree display part 91, a clip display part 92, and a project list display part 93.

The tree display part 91 of the project manger window 90 shows the storage locations of all, files containing projects (hereinafter, referred to as project files) in a form of a tree, the project files existing in the editing terminal device $9_1$ to $9_n$ and in the project file server 10 which manages all project files.

The clip display part 92 shows a list of thumbnail images of clips belonging to a project being selected in the tree display part 91 as icons (hereinafter, referred to as clip icons) 94. The clip list display part 93 shows a list of management information such as a storage drive name, a project name, and update date and time, for each project being displayed in the tree display part 91.

Figure 6:
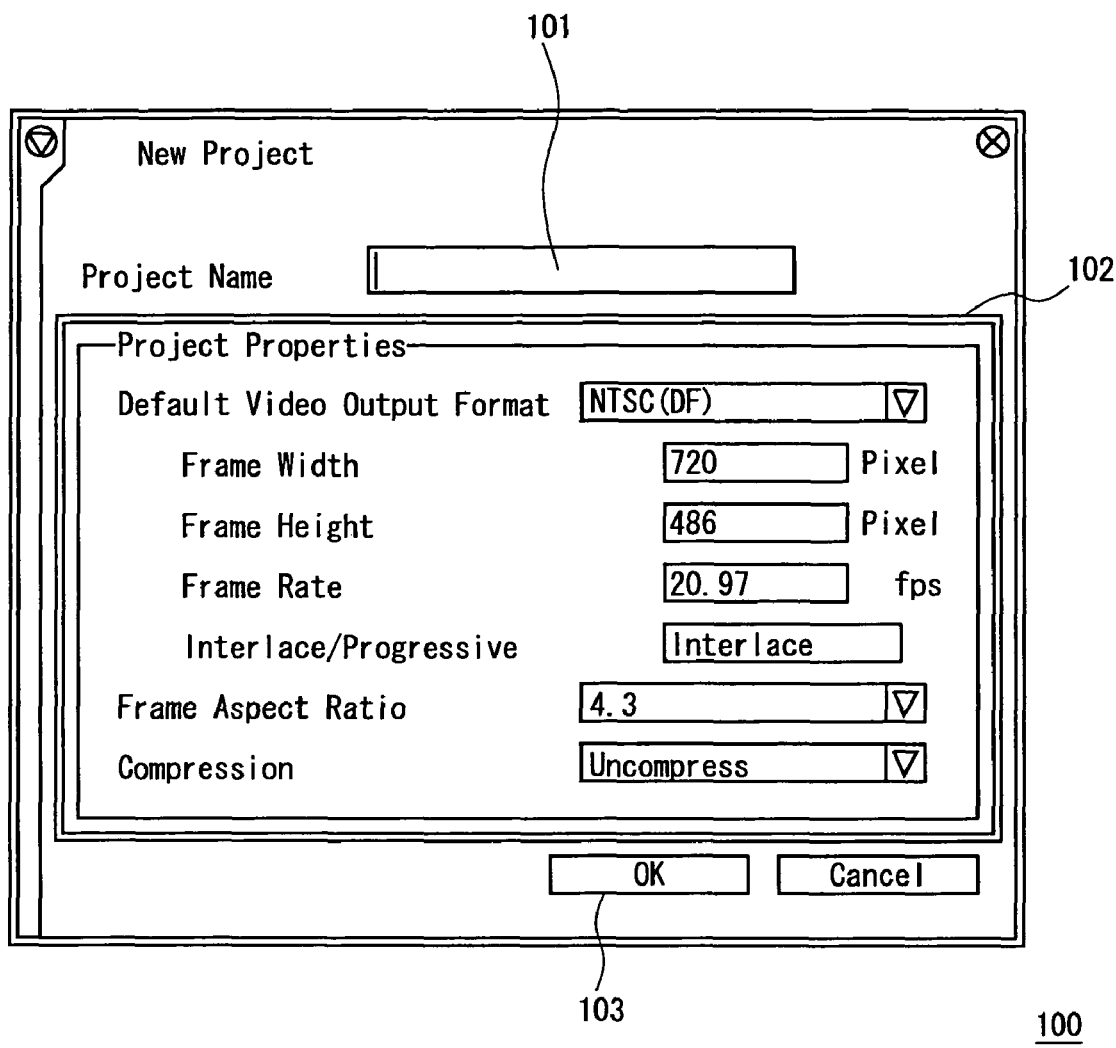
FIG. 6 is a schematic diagram showing a new project dialog.

In a case of creating a new project, the operator clicks a new creation button 95A out of a button group 95 being displayed at the upper part of the project manager window 90, to display a new project dialog 100 shown in FIG. 6. Then the operator enters a desired project name in a project name input box 101 of the new project dialog 100, sets various attributes regarding this project in an attribute setting part 102, and then clicks an OK button 103.

Figure 5:
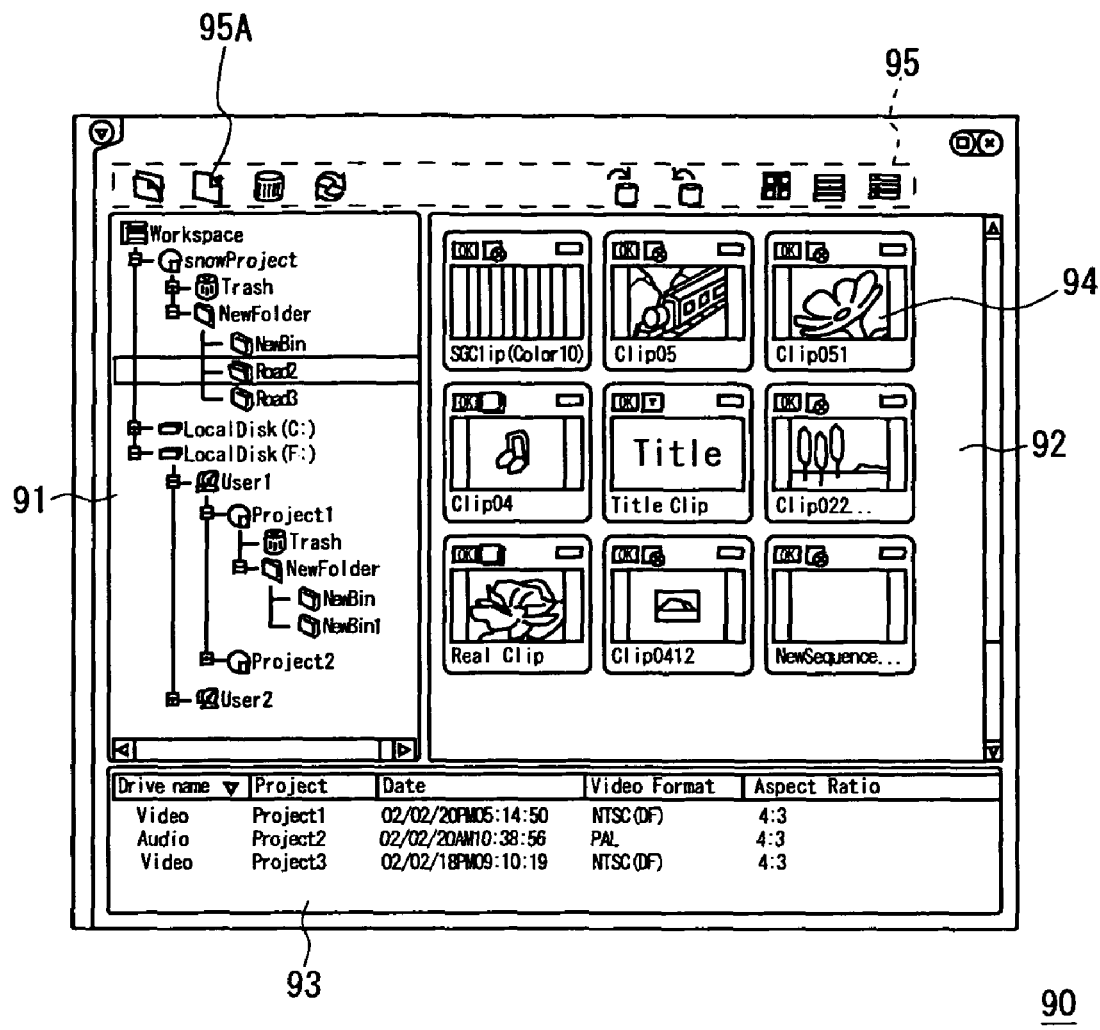
FIG. 5 is a schematic diagram showing a project manager window.

As a result, the new project is newly registered in the editing terminal device $9_1$ to $9_n$ and the project file server 10, and a new folder and bin are automatically created in this project. This result is reflected in the tree display part 91 and the project list display part 93 of the project manager window 90 (FIG. 5).

Figure 7:
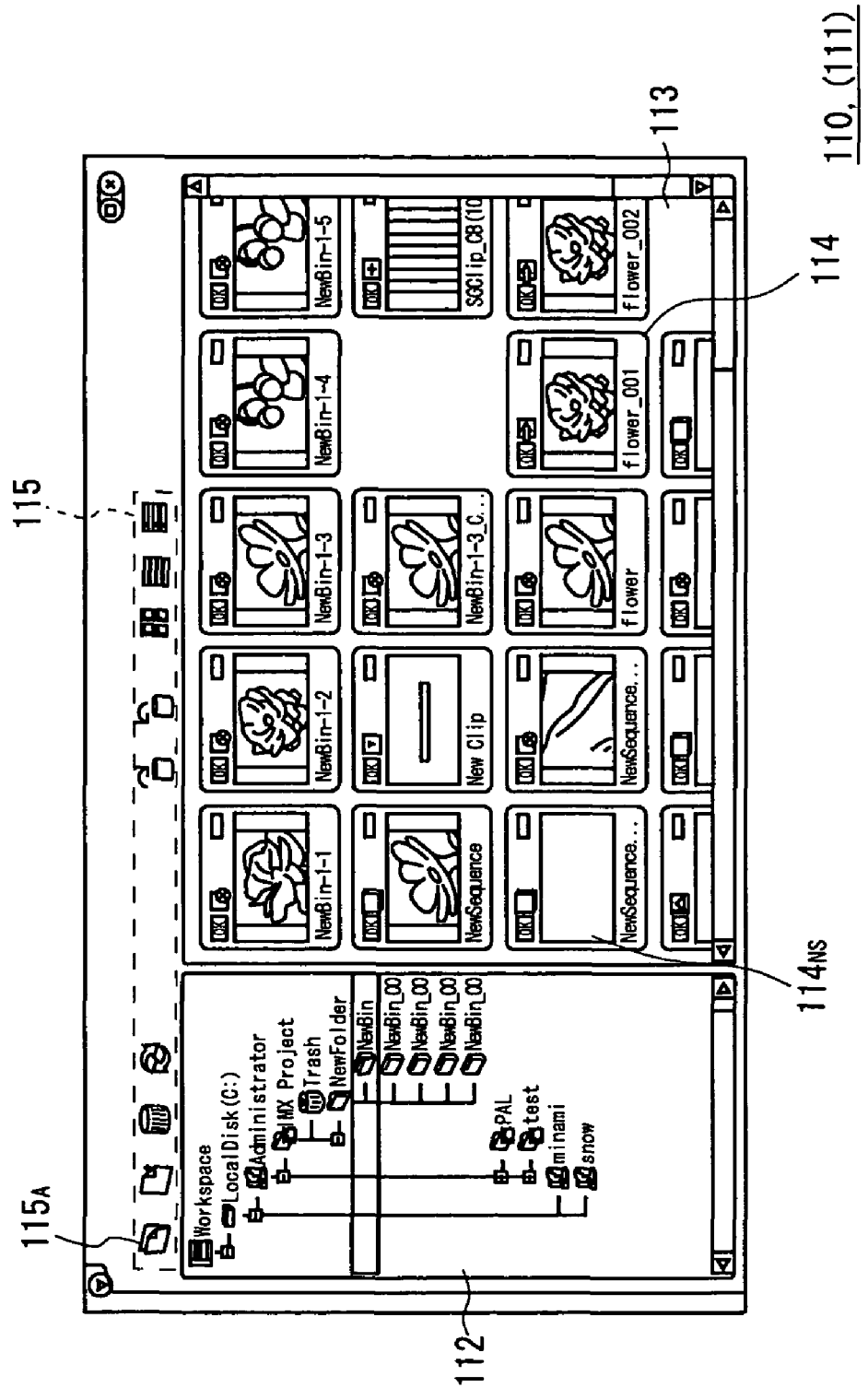
FIG. 7 is a schematic diagram showing a clip explorer window.

At this time, the display 82 (FIG. 4) displays a clip explorer window 110 shown in FIG. 7 and a server site explorer window 111 having the same structure.

The clip explorer window 110 is a window to display and manage clips belonging to a project being open, and is composed of a tree display part 112 and a clip display part 113.

The tree display part 112 of the clip explorer window 110 shows all projects and their contents (folders, bins) existing in the system in a form of a tree. The clip display part 113 shows a list of clip icons 114 for all clips belonging to a bin being selected in the tree display part 112. Since there is no clip belonging to a new project in the initial state just after the new project is created, the clip display part 113 of the clip explorer window 110 does not display any clip icon 114.

The server site explorer window 111, on the other hand, is a window to display a list of clips being recorded in the material server 3 and the proxy server 6, and is composed of a tree display part 112 and a clip display part 113, similarly to the clip explorer window 110.

The tree display part 112 of the server site explorer window 111 shows all folders, files and so on existing in the material server 3 and the proxy server 6 in a form of a tree. The clip display part 113 shows the clip icons 114 for all clips being stored in a folder or the like being selected in the tree display part 112.

Figure 8:
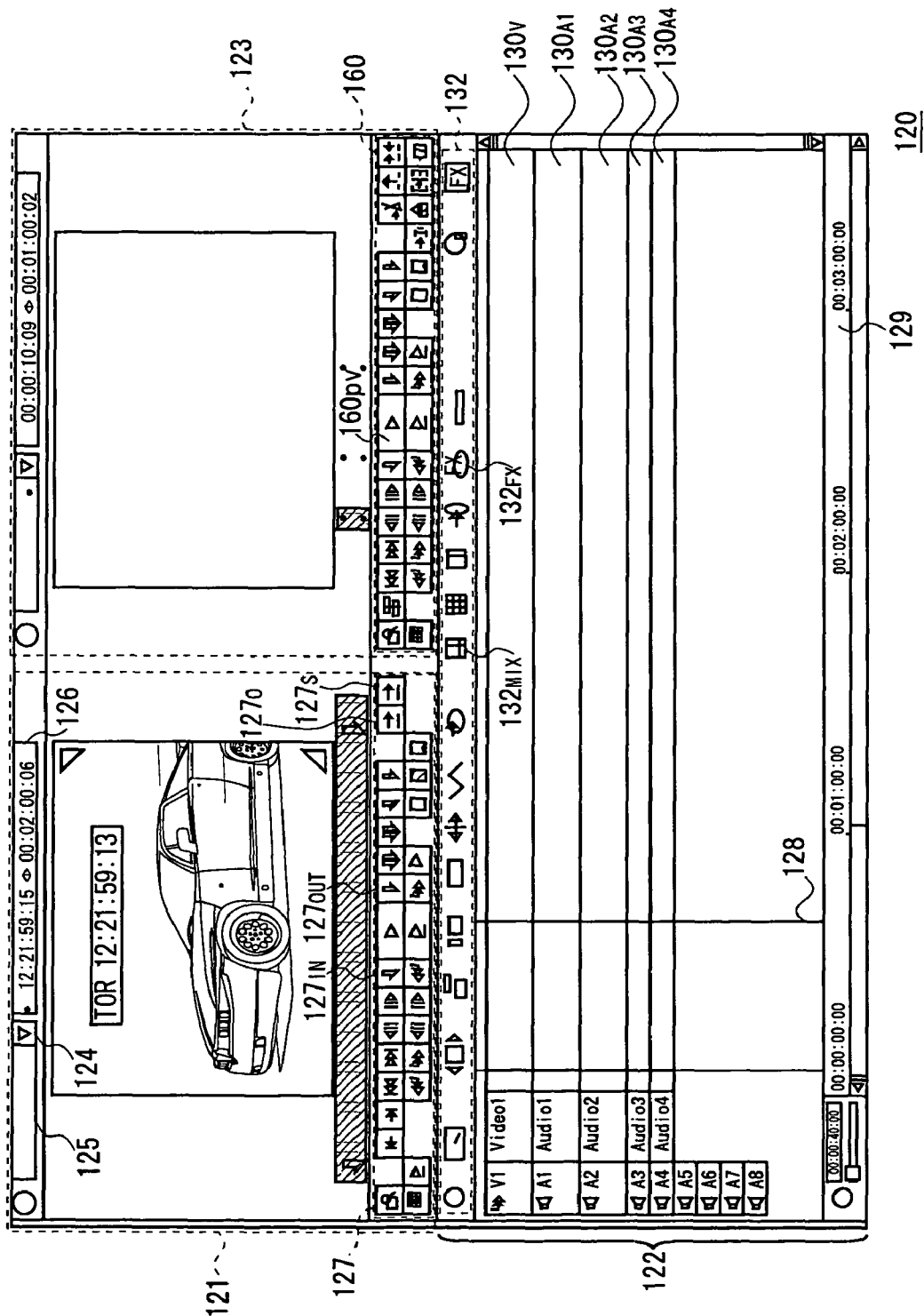
FIGS. 8 to 10 are schematic diagrams showing a time line editor window.

To create a new edit list, the operator clicks a new sequence creation button $115_A$ of the button group 115, which is positioned at the upper part of the clip explorer window 110, after creating the new project as described above. As a result, a clip icon $114_{NS}$ for an edit list to be created is displayed in the clip display part 113 of the clip explorer window 110 and a time line editor window 120 shown in FIG. 8 is also displayed on the display 82 (FIG. 4).

The time line editor window 120 is composed of a source viewer part 121 for extracting a desired part as a cut while visually confirming the video of a clip, a time line part 122 for setting edit details indicating how to arrange extracted cuts and which special effects are applied to the connecting parts of the cuts, and a master viewer part 123 for confirming the edit details set in the time line part 122, by using high-resolution video.

Then the operator moves the clip icon 114 of a desired clip out of the clip icons 113 being displayed in the clip display part 113 of the server site explorer window 111 (FIG. 7) onto the source viewer part 121 of the time line editor window 120 (FIG. 8) by drug and drop, thereby selecting this clip as a clip to be edited. By repeating these processes, plural clips can be selected.

With the time line editor window 120, the operator can display menu listing clips selected as described above, by clicking a clip select menu display button 124 locating at the upper part of the source viewer part 121. Further, the operator can select a desired clip in this menu as a clip to be edited.

For example, the video of the beginning frame of a clip being selected is displayed in the source viewer part 121, the name of the clip is shown in a clip list box 125, and the time code of the frame of the clip being displayed in the source viewer part 121 and the material length of the clip are shown in a time code display part 126.

With the time line editor window 120, the operator can playback video based on the low-resolution video/audio data D2 (FIG. 1) of a clip being selected to be edited, which is recorded in the proxy server 6 (FIG. 1), at a normal speed, frame by frame, or backwards frame by frame, by clicking a desired command button of a command button group 127 locating at the lower part of the source viewer part 121.

In actual, when a command button for normal playback, frame playback, or frame backward playback of the command button group 127 is clicked, the CPU 70 (FIG. 4) controls the proxy server 6 via the system control part 5 (FIG. 1) accordingly. Thereby the low-resolution video/audio data D2 of the video/audio part corresponding to the clip is read in the playback mode corresponding to the command button clicked. As a result, the low-resolution video based on the low-resolution video/audio data D2 is played back in the source viewer part 121 at a normal speed, frame by frame, or backwards frame by frame.

Thus the operator can specify a start point (IN-point) and an end point (OUT-point) of a video/audio part to be used as a cut out of a clip by clicking a mark-in button $127_{IN}$ and a mark-out button $127_{OUT}$ of the command button group 127 in a situation where desired video is displayed, while visually confirming the video of the clip being displayed in the source viewer part 121.

In addition, the operator can create an edit list in the following manner by using video/audio parts specified as described above as cuts of clips.

First the operator specifies a range of a video/audio part of a clip to be used as a cut as described above, then moves a play line 128 being displayed in the time line part 122 to a desired position with the mouse with a time scale 129 locating at the lower part of the time line part 122 as an index, and clicks an overwrite button $127_o$ or a splice IN button $127_s$ of the command button group 127 locating at the lower part of the source viewer part 121.

Figure 9:
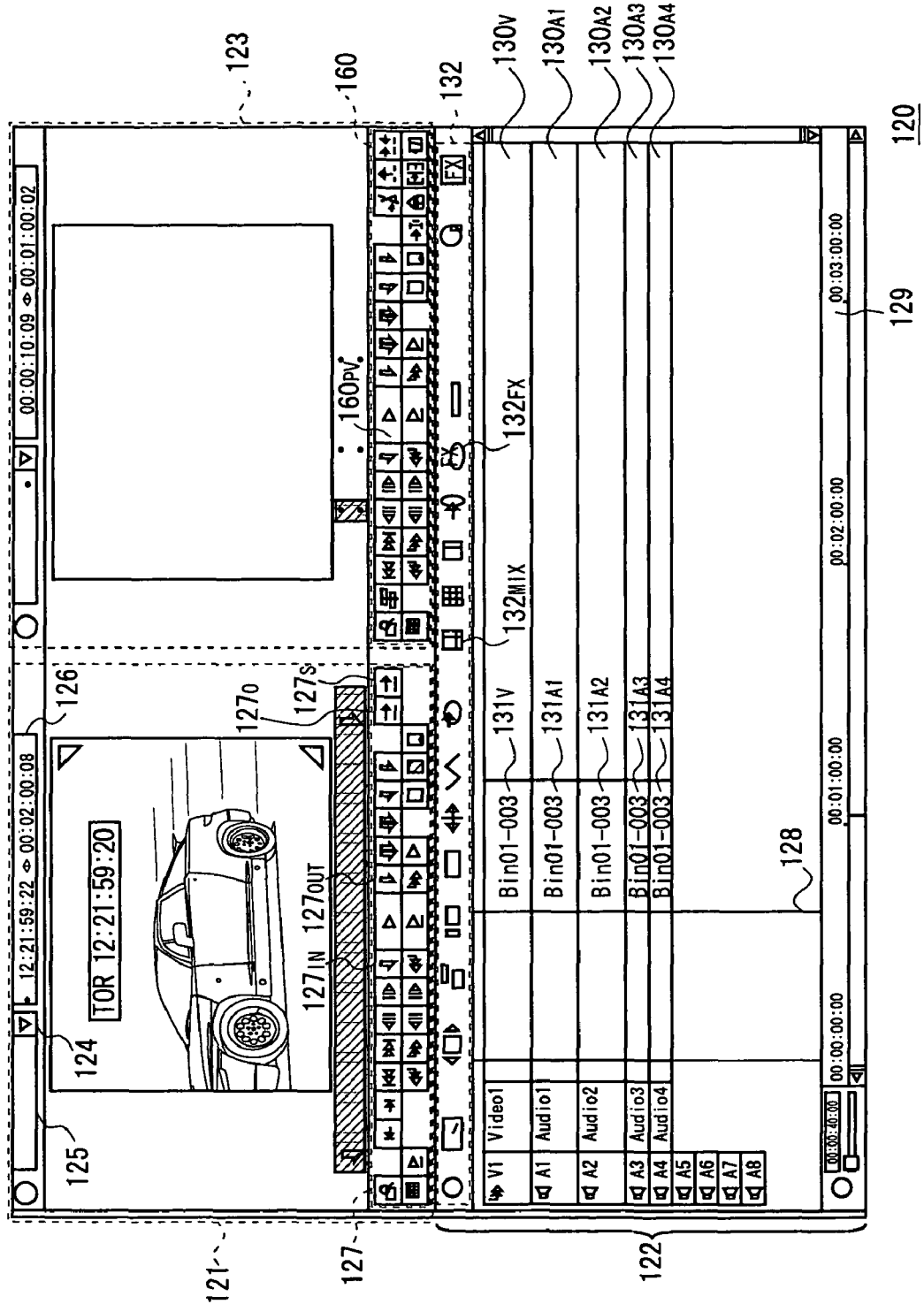

As a result, as shown in FIG. 9, by overwriting when the overwrite button $127_o$ is clicked or by inserting when the splice IN button $127_s$ is clicked, a colored area $131_v$ having the material length of the video/audio part is arranged with its beginning position placed on the play line 128 on the video track $130_v$ of the time line part 122.

In a case where audio is accompanied with the video/audio part, colored areas $131_{A1}$ to $131_{A4}$ having the same length of the corresponding colored area $131_v$ of the video track $130_v$ are arranged with their beginning positions positioned on the play line 128 on the audio tracks $130_{A1}$ to $130_{A4}$ equal to the number of channels out of a plurality of the audio tracks $130_{A1}$ to $130_{A4}$ provided at the lower part of the video track $130_v$.

At this time, the CPU 70 notifies the system control unit 5 of a command according to operator's operation. As a result, under the control of the system control unit 5, the high-resolution video/audio data D1 of the video/audio part of the corresponding clip is read from the material server 3 (FIG. 1), with margins of several seconds on the IN-point side and the OUT-point side. This data is then given and stored in the data I/O cache unit $15_1$ to $15_n$ corresponding to the editing terminal device $9_1$ to $9_n$ via the gateway 13 (FIG. 1) and FC switcher 14 (FIG. 1).

When the operator desires output of audio other than audio accompanied with the video/audio part at a time of playback of the edited video/audio, he/she clicks the clip select menu display button 124 to select a previously registered clip for the audio from a list of clips being displayed, moves the play line 128 of the time line part 122 to a desired position, and clicks the above-described overwrite button $127_o$ or splice IN button $127_s$ after specifying a desired audio track $130_{A1}$ to $130_{A4}$.

In this case, a colored area $131_{A1}$ to $131_{A4}$ having the length corresponding to the material length of the clip is displayed with its beginning position positioned on the play line 128 on the audio track $130_{A1}$ to $130_{A4}$ specified. And in a case where this clip has been recorded in the material server 3, its audio data is read from the material server 3 and stored in the data I/O cache unit $15_1$ to $15_n$.

Figure 10:
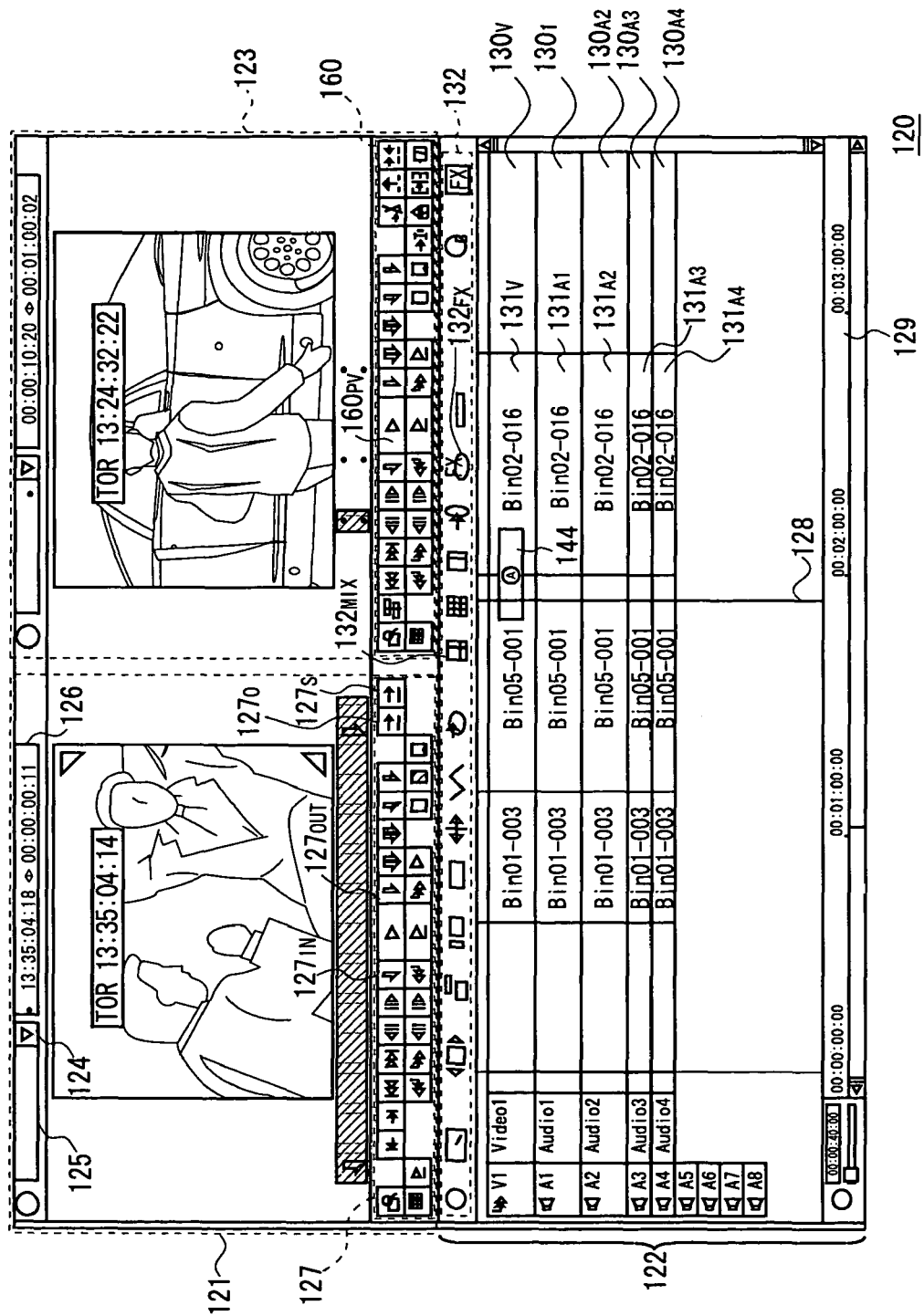

Then the operator repeats operation including specifying a range of a video/audio part to be used as a cut as described above (determining a cut) and pasting the video/audio part to the time line part 122 (displaying colored areas $131_v$, $131_{A1}$ to $131_{A4}$ on the video track $130_v$ and/or audio tracks $130_{A1}$ to $130_{A4}$), thereby sequentially displaying the colored areas $131_v$, $131_{A1}$ to $131_{A4}$ on the video track $130_v$ and the audio tracks $130_{A1}$ to $130_{A4}$ so as to continue on the time scale 129 for a desired period of time from the beginning ("00:00.00: 00") of the time scale 129 as shown in FIG. 10.

Displaying the colored areas $131_v$, $131_{A1}$ to $131_{A4}$ on the video track $130_v$ and the audio tracks $130_{A1}$ to $130_{A4}$ in the time line part 122 means that video/audio are displayed/output based on the video/audio parts corresponding to the colored areas $131_v$, $131_{A1}$ to $131_{A4}$ at time specified by the time scale 129 in the playback of edited video/audio. Therefore, an edit list specifying the order and contents of video/audio to be displayed/output as edited video/audio can be created.

The numbers of video tracks $130_v$ and audio tracks $130_{A1}$ to $130_{A4}$ to be displayed in the time line part 122 can be set as desired. In a case where cuts or clips are pasted to plural video tracks $130_v$ and audio tracks $130_{A1}$ to $130_{A4}$ provided, edited video is created by superimposing video existing at the same position on the time scale 129 of the video tracks $130_v$, and edited audio is created by synthesizing audio existing at the same position on the time scale 129 of the audio tracks $130_{A1}$ to $130_{A4}$.

In creating an edit list as described above, when the operator desires to apply special effects to the connecting part of first cut video and second cut video, he/she can set desired video special effects in the following manner.

Figure 11:
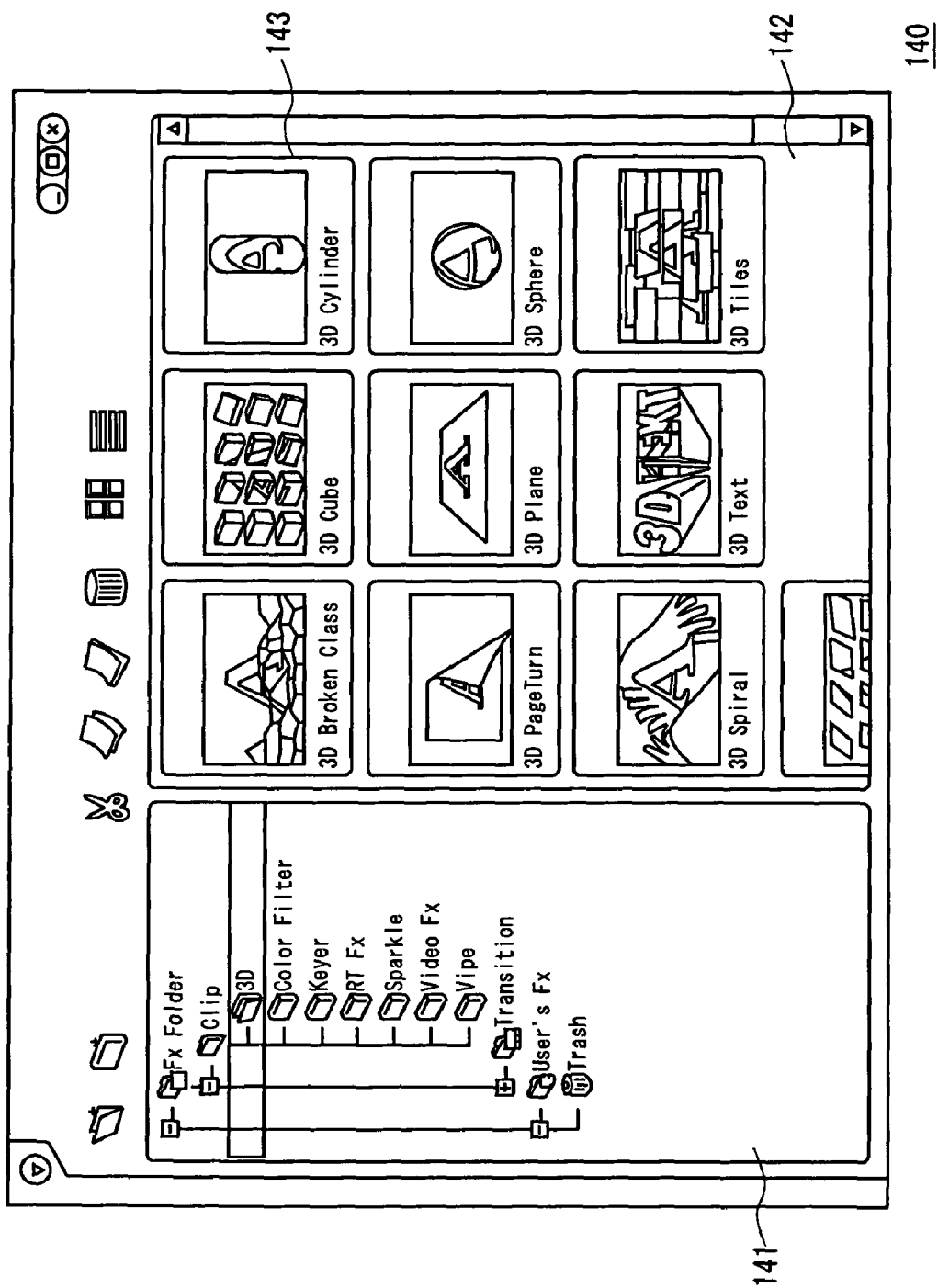
FIG. 11 is a schematic diagram showing an FX explorer window.

First the preceding first cut and the next second cut are pasted to the video track $130_V$ so as to continue on the time scale 129, and then an FX explorer button $132_{FX}$ is clicked out of the button group 132 locating at the upper part of the time line part 122. As a result, an FX explorer window 140 as shown in FIG. 11 is displayed on the display 82 (FIG. 4).

This FX explorer window 140 is composed of a tree display part 141 and an icon display part 142. The tree display part 141 displays various kinds of video special effects which can be applied by the editing terminal device $9_1$ to $9_n$. The icon display part 142 shows images subjected to the video special effects, in a form of icons.

Next the operator pastes the special effect icon 143 for a desired video special effect out of the icons (hereinafter, referred to as special effect icons) 143 being displayed in the icon display part 142 of the FX explorer window 140, to the connecting part of the first and second cuts in the video track $130_V$ of the time line editor window 120 by drug and drop.

As a result, in creating edited video, setting for applying the video special effect corresponding to the special effect icon, which has been pasted to the video track $130_V$ as described above, at the switching time from the first cut video to the second cut video has been done.

In a case where a special effect icon 143 is pasted to the video track $130_V$ of the time line editor window 120, a mark 144 corresponding to the special effect icon 143 is displayed at the pasting position as shown in FIG. 10.

In addition, when the operator creates an edit list, if he/she desires to apply audio mixing to audio of a cut or a clip pasted to an audio track $130_{A1}$ to $130_{A4}$, the desired audio mixing can be set in the following manner.

First the operator moves the play line 128 being displayed in the time line part 122 of the time line editor window 120, to the colored area $131_{A1}$ to $131_{A4}$ corresponding to a desired cut or clip to be subjected to the audio mixing, out of the cuts or clips pasted to the audio tracks $130_{A1}$ to $130_{A4}$, and then clicks an audio mixer button $132_{MIX}$ of the button group 132 locating at the upper part of the time line part 122.

Figure 12:
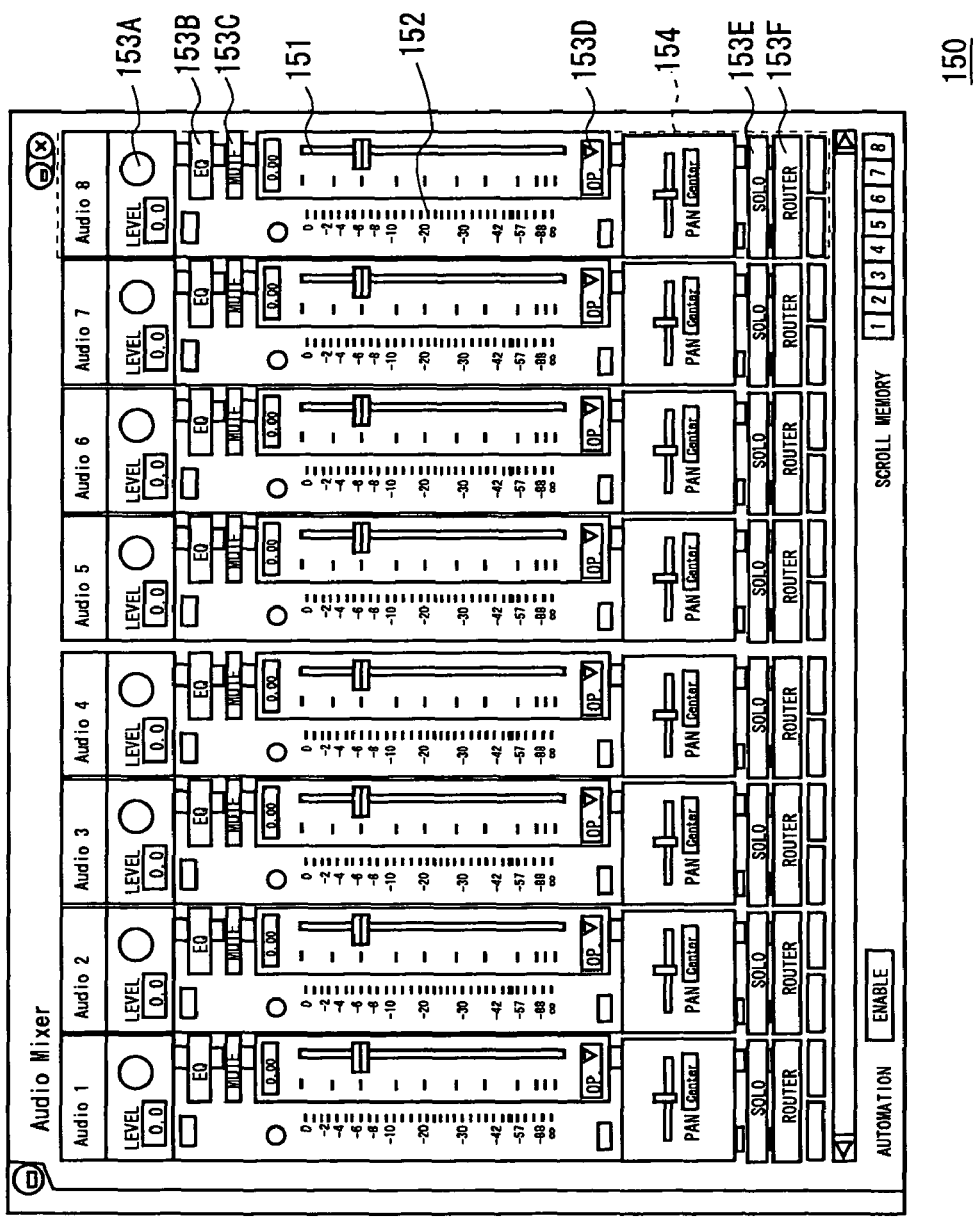
FIG. 12 is a schematic diagram showing an audio mixer window.

As a result, as shown in FIG. 12, an audio mixer window 150 is displayed in which a plurality of mixing parts 154 each having a volume 151, a level meter 152 and various setting buttons 153A to 153F are provided in correspondence with the audio tracks $130_{A1}$ to $130_{A4}$ of the time line part 122 of the time line editor window 120.

Then the operator operates the volume 151 and the setting buttons 153A to 153F corresponding to a desired audio track $130_{A1}$ to $130_{A4}$ of the time line part 122 of the time line editor window 120 while visually confirming the level meter 152, the volume 151 and setting buttons 153A to 153F being displayed in the audio mixer window 150.

Thereby, for outputting edited audio, such setting has been done that the audio mixing should be applied, based on the details set as described above, to the audio data at a time of playback of the audio part pasted to the audio track $130_{A1}$ to $130_{A4}$.

Further, with the time line editor window 120 (FIG. 10), the operator moves the play line 128 of the time line part 122 to a desired position with the mouse after or while creating the edit list as described above, and clicks a preview button $160_{PV}$ of a command button group 160 being displayed at the lower part of a master viewer part 123, thereby playing back the high-resolution edited video in the master viewer part 123 at a normal speed with the video/audio part corresponding to the play line 128 as a start point.

In actual, when the preview button $160_{PV}$ is clicked, the CPU 70 controls the video special effect/audio mixing processing unit 75 (FIG. 4) to read the high-resolution video/audio data D1 of the corresponding video/audio part from the data I/O cache unit $15_1$ to $15_n$, and to apply video special effects and audio mixing to the high-resolution video/audio data D1 according to necessity.

As a result, the high-resolution edited video/audio data D3 subjected to the video special effects and the audio mixing is created and given to the data processing unit 74 (FIG. 4), thereby displaying and outputting edited video and audio based on the edited video/audio data D3 in the master viewer part 123 of the time line editor window 120 and from the loudspeaker 83 (FIG. 4).

Therefore, the operator can create an edit list while occasionally viewing and confirming edit details based on the edited video being displayed in the master viewer part 123 of the time line editor window 120 or can confirm the contents of the created edit list.

After creating the edit list as described above, the operator moves the clip icon $114_{NS}$ corresponding to the edit list being displayed in the clip display part 113 of the clip explorer window 110 (FIG. 7) onto the clip display part 113 of the server site explorer window 111 (FIG. 7) by drug and drop, thereby registering the editing result based on the edit list in the material server 3 (FIG. 1).

In actual, the CPU 70 controls the video special effect/audio mixing processing unit 75 (FIG. 4) based on a created edit list to create edited video/audio data D3 of edited video and audio based on the edit list by using high-resolution video/audio data D1 being stored in the data I/O cache unit $15_1$ to $15_n$ and sends it to the material server 3. As a result, this edited video/audio data D3 is registered in the material server 3 by being stored in a file of the above-described sequence clip. In addition, the data of this edit list (hereinafter, referred to as edit list data, simply) is given to the material server 3 via the system control unit 5 to be stored in the file of the sequence clip.

As described above, with an editing terminal device $9_1$ to $9_n$, the operator can create a desired edit list by using the time line editor window 120 and further, create edited video and audio based on the edit list and register them in the material server 3.

(6) EDL Import Function

An EDL import function installed in this on-air system 1 will be next described.

With an editing terminal device $9_1$ to $9_n$ in the on-air system 1, not only a final edit list can be crated from the beginning but also the final edit list can be crated by taking in and using an EDL previously created with a proxy editing terminal device $8_1$ to $8_n$.

Figure 13:
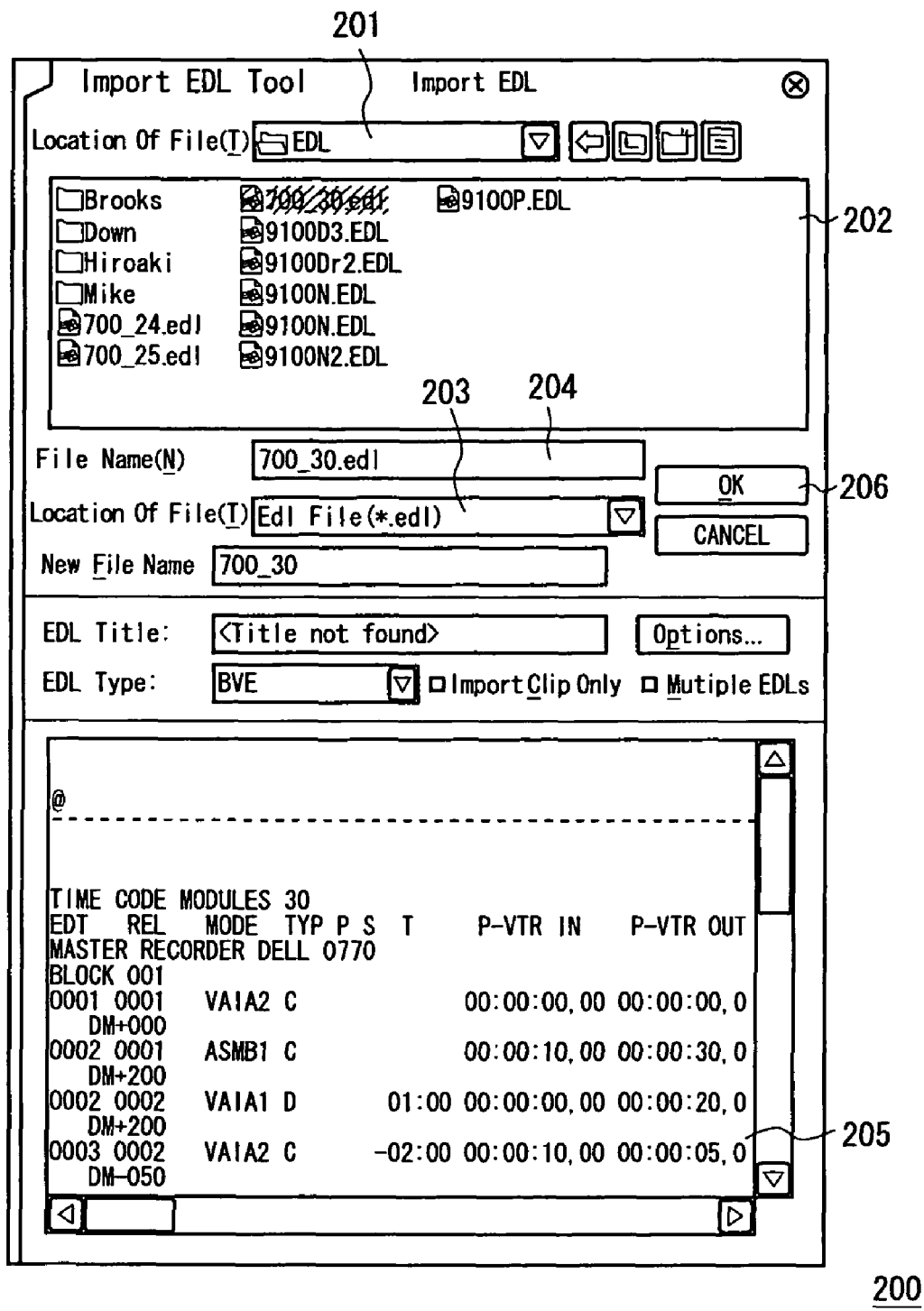
FIG. 13 is a schematic diagram showing an import EDL tool window.
Figure 14:
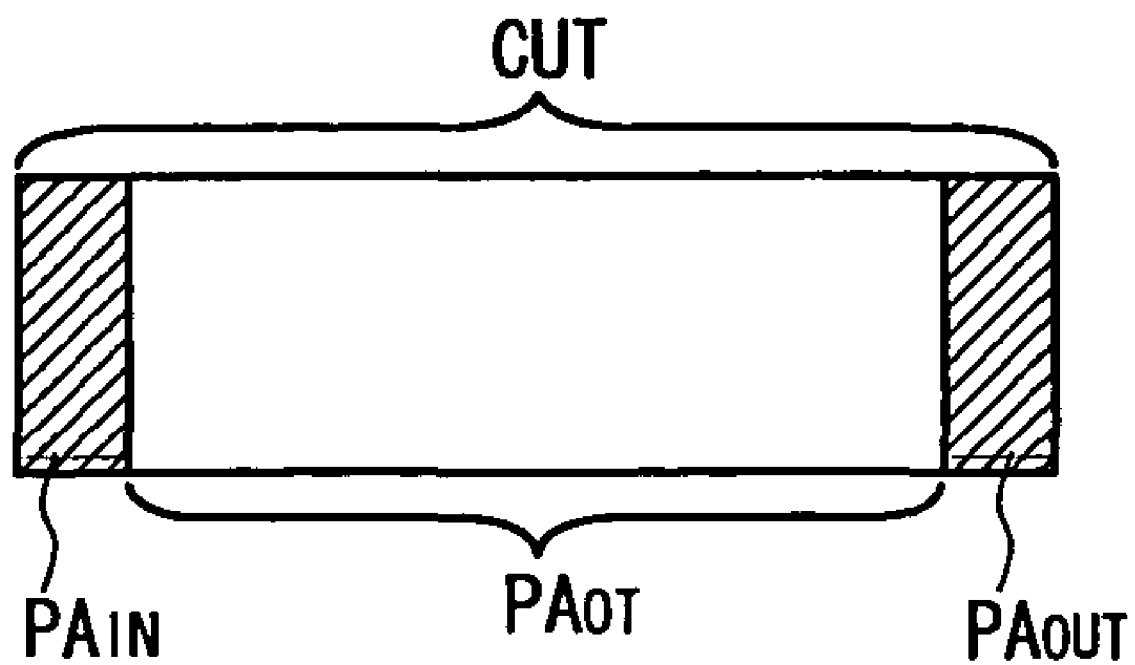
FIG. 14 is a conceptual view explaining how to read each video/audio part used in an imported edit list.

In actual, to import EDL data being stored and managed by a proxy editing terminal device $8_1$ to $8_n$, the operator selects the file name of a desired EDL being displayed in the tree display part 112 of the clip explorer window 110 (FIG. 7), and then selects "EDL import" from a menu not shown, which appears by clicking the right button of the mouse 80 (FIG. 4). Thereby, an import EDL tool window 200 as shown in FIG. 13 can be displayed on the display 82 (FIG. 4) of the editing terminal device $9_1$ to $9_n$.

On this import EDL wool window 200, the folder name of a folder storing the EDL file being selected is displayed in a storage location display box 201. In addition, out of various files being stored in the folder, files of a type (EDL file type) being shown in a file type display box 203 are displayed in a file list display part 202, and the file name of the EDL file being selected at this time is displayed in a file name box 204.

In addition, on the import EDL tool window 200, detailed information on the EDL is displayed in an EDL detail area 205, based on the management information of the EDL being managed by the proxy editing terminal device $8_1$ to $8_n$ which is an import source, the detailed information indicating which video/audio parts of which clips are used as cuts.

To import the EDL, the operator just clicks an OK button 206 after confirming that the file name of the EDL is displayed in the file name box 204. At this time, the EDL data of the EDL is transferred to and taken in the editing terminal device $9_1$ to $9_n$ via the Ethernet 7 from the proxy editing terminal device $8_1$ to $8_n$. The EDL file imported in this way is automatically opened, resulting in displaying the time line edit window 120 (FIG. 9) in which, for example, colored areas $131_V$, $131_{A1}$ ... based on the EDL are displayed in the time line part 122.

As described above, with an editing terminal device $9_1$ to $9_n$, a desired EDL out of EDLs being managed by the proxy editing terminal devices $8_1$ to $8_n$ can be imported.

(7) Automatic Loading at a Time of Importing EDL

An automatic loading function at a time of importing an EDL, which is installed in this on-air system 1, will be next described.

This on-air system 1 is composed of the data I/O cache units $15_1$ to $15_n$ each comprising a semiconductor memory which is accessible faster than the material server 3 (that is, high-resolution video/audio data D1 can be read and written faster), between the material server 3 and the editing terminal devices $9_1$ to $9_n$, as described above. When a video/audio part extracted from a clip is pasted to the time line part 122 (FIG. 8) of the time line editor window 120 (FIG. 8) as described above with reference to FIG. 8 to FIG. 10, the high-resolution video/audio data D1 of the video/audio part is read from the material server 3 and stored in a corresponding data I/O cache unit $15_1$ to $15_n$. As a result, edited video and audio based on the high-resolution video/audio data D1 of the video/audio part can be displayed and output immediately.

When an EDL created with a proxy editing terminal device $8_1$ to $8_n$ is imported to an editing terminal device $9_1$ to $9_n$ to continue its creation work, the high-resolution video/audio data D1 of each video/audio part which is used in the EDL is not stored in the data I/O cache unit $15_1$ to $15_n$ corresponding to the editing terminal device $9_1$ to $9_n$. Therefore, after this EDL is imported, the high-resolution edited video and audio based on the EDL cannot be viewed immediately, which is a problem.

To solve this problem, this on-air system 1 is provided with an automatic loading function to immediately and automatically load the high-resolution video/audio data D1 of each video/audio part which is used in an EDL, in the corresponding data I/O cache unit $15_1$ to $15_n$ when the EDL data of the EDL is imported to the editing terminal device $9_1$ to $9_n$ and opened.

In actual, when an editing terminal device $9_1$ to $9_n$ receives a command to import therein a desired EDL file by specifying an EDL file on the above-described import EDL tool window 200, it accesses the proxy editing terminal device $9_1$ to $9_n$ storing the EDL data of the specified EDL to display the time line editor window 120 displaying the obtained EDL thereon, on the display 82.

In addition, simultaneously, the editing terminal device $9_1$ to $9_n$ accesses the system control unit 5 to confirm what clips the corresponding data I/O cache unit $15_1$ to $15_n$ stores, and determines based on its result and the EDL data whether there are clips which are used in the EDL but are not stored in the corresponding data I/O cache unit $15_1$ to $15_n$.

When the editing terminal device $9_1$ to $9_n$ determines that there are clips which are used in the EDL but are not stored in the corresponding data I/O cache unit $15_1$ to $15_n$, it sends a readout request of the clips to the system control unit 5.

The system control unit 5 controls the material server 3 based on the readout request received from the editing terminal device $9_1$ to $9_n$ to make the material server 3 read the high-resolution video/audio data D1 of each clip requested. As a result, the high-resolution video/audio data D1 is given to and stored in the corresponding data I/O cache unit $15_1$ to $15_n$ via the gateway 13 and the FC switcher 14 in order.

Thus, when the command button group 160 (FIG. 10) of the master viewer part 123 of the time line editor window 120 being displayed is operated to send a playback command to the editing terminal device $9_1$ to $9_n$, the device $9_1$ to $9_n$ reads the corresponding high-resolution video/audio data D1 from the data I/O cache unit $15_1$ to $15_n$ and displays the video based on the high-resolution video/audio data D1 in the master viewer part 123. This allows the operator to view and listen to the high-resolution edited video and audio based on the EDL immediately.

In this embodiment, when the editing terminal device $9_1$ to $9_n$ sends the system control unit 5 a readout request of high-resolution video/audio data D1 of a video/audio part of each clip which is used in an EDL, it gives the readout request to the system control unit 5 so that the high-resolution video/audio data D1 around the edited point (around the connecting part to another cut) of the video/audio part is preferentially transferred.

That is, when the editing terminal device $9_1$ to $9_n$ sends the readout request to the system control unit 5, it first sends the system control unit 5 a readout request regarding the high-resolution video/audio data D1 of the video/audio parts $PA_{IN}$ and $PA_{OUT}$ for several seconds (for example, 2-10 seconds) on the IN-point side and OUT-point side, and then sends a readout request regarding the remaining part $PA_{OT}$ of the video/audio part.

As a result, under the control of the system control unit 5 responding to this readout request, the high-resolution video/audio data D1 of the video/audio parts $PA_{IN}$ and $PA_{OUT}$ for several seconds on the IN-point side and OUT-point side of the video/audio part is first read from the material server 3 and stored in the corresponding data I/O cache unit $15_1$ to $15_n$. Then the high-resolution video/audio data D1 of the remaining part $PA_{OT}$ of the video/audio part CUT is read from the material server 3 and stored in the data I/O cache unit $15_1$ to $15_n$.

As described above, in this on-air system 1, when an imported EDL file is opened, the editing terminal device $9_1$ to $9_n$ preferentially loads the high-resolution video/audio data D1 of the connecting parts of cuts, which are often previewed in the creation work of an edit list, in the data I/O cache unit $15_1$ to $15_n$, so that the operator can start the creation work of the edit list just after the EDL is opened.

(8) Operation and Effects of this Embodiment

According to the above configuration, in this on-air system 1, high-resolution video/audio data to be used in editing is stored as high-resolution video/audio data D1 in the material server 3 and the high-resolution video/audio data D1 is converted to low-resolution video/audio data D2 through the down conversion and the compressing and-encoding process, and the data D2 is stored in the proxy server 6.

Then with the low-resolution video/audio data D2, an EDL for only cut editing, which can be created by using low-resolution video/audio data, is created with a proxy editing terminal device $8_1$ to $8_n$.

Then when a final edit list requiring high-resolution video/audio data is created with an editing terminal device $9_1$ to $9_n$, the device $9_1$ to $9_n$ imports therein an EDL created by the proxy editing terminal device $8_1$ to $8_n$ via the Ethernet 7 and reads the high-resolution video/audio data D1 corresponding to the low-resolution video/audio data used at a time of creating the EDL, from the material server 3 based on the EDL.

Then the editing terminal device $9_1$ to $9_n$ creates the final edit list with the high-resolution video/audio data D1 based on the imported EDL.

According to the above configuration, in the on-air system 1, the low-resolution video/audio data D2 of a smaller data volume is used to create an EDL, resulting in reducing time to create the EDL. In addition, the low-resolution video/audio data D2 and the high-resolution video/audio data D1 having the same contents and the different resolutions are stored in the material server 3 and the proxy server 6, respectively, so that the creation of the final edit list with the high-resolution video/audio data D1 can be started based on an EDL in a short time after the EDL is created by using the low-resolution video/audio data, thus making it possible to significantly improve working efficiency of the editing work with reducing time to create the EDL and the final edit list.

In addition, in this on-air system 1, an EDL is created by using low-resolution video/audio data D2 of a smaller data volume. Therefore, the proxy editing terminal devices $8_1$ to $8_n$ which create EDLs do not necessarily have processing capability as good as the editing terminal devices $9_1$ to $9_n$. As a result, EDLs can be created with the proxy editing terminal devices $8_1$ to $8_n$ with a simple construction.

In addition, in this on-air system 1, when the high-resolution video/audio data D1 of each video/audio part used in the EDL is loaded into a corresponding data I/O cache unit $15_1$ to $15_n$ as described above, the high-resolution video/audio data D1 of the video/audio parts $PA_{IN}$ and $PA_{OUT}$ for several seconds on the IN-point side and OUT-point side, which are often previewed out of the video/audio part, is first loaded, and then the remaining part $PA_{OT}$ of the video/audio part is loaded, resulting in significantly reducing time required for the editing work with efficiently reducing operator's waiting time.

(9) Other Embodiments

Note that the above-described embodiment has described a case where this invention is applied to the on-air system 1 constructed as shown in FIG. 1. This invention, however, is not limited to this and can be widely applied to editing systems having various constructions.

Further, the above-described embodiment has described a case where EDL data is imported in an editing terminal device $9_1$ to $9_n$ and its file is opened simultaneously. This invention, however, is not limited to this and the file may be opened when an open command is issued after the import. In this case, when the file is opened, the high-resolution video/audio data D1 of the video/audio part of each clip which is used in the EDL may be read from the material server 3.

Still further, the above-described embodiment has described a case where edit material to be edited is video/audio material. This invention, however, is not limited to this and can be applied to a case where edit material may be video material comprising only video.

Still further, the above-described embodiment has described a case where the material server 3 and the proxy server 6 for storing video/audio data of each clip obtained by coverage are each comprising a plurality of RAIDs. This invention, however, is not limited to this and the material server 3 has another construction.

Still further, the above-described embodiment has described a case where the data I/O cache units $15_1$ to $15_n$ for storing high-resolution video/audio data D1 read from the material server 3 each comprises a semiconductor memory. This invention, however, is not limited to this and storage media other than semiconductor devices can be used, provided that the media have faster accessibility than the material server 3.

Still further, the above-described embodiment has described a case where the editing terminal devices $9_1$ to $9_n$ are constructed as shown in FIG. 2, which read and edit the high-resolution video/audio data D1 from the data I/O cache units $15_1$ to $15_n$ based on selected edit lists to create edited video based on the edit lists. This invention, however, is not limited to this and another construction can be widely applied.

Still further, the above-described embodiment has described a case where the system control unit 5 for controlling the entire on-air-system 1 is applied as a control means for controlling the material server 3 and the data I/O cache units $15_1$ to $15_n$. This invention, however, is not limited to this and the functions of the system control unit 5 according to this invention can be provided in the editing terminal devices $9_1$ to $9_n$.

Still further, the above-described embodiment has described a case where, when the material server 3 reads the high-resolution video/audio data D1 of the video/audio part of each clip which is used in an imported EDL, the high-resolution video/audio data D1 around the edited point of the video/audio part is preferentially read in response to a readout request sent from the editing terminal device $9_1$ to $9_n$ to the system control unit 5. This invention, however, is not limited to this and a system can be designed so that only the system control unit 5 controls the preferential readout of the high-resolution video/audio data D1 around the edited points of a video/audio part and the editing terminal devices $9_1$ to $9_n$ are not involved. Specifically, for example, the system may be designed so that an editing terminal device $9_1$ to $9_n$ gives the system control unit 5 a readout request of the video/audio part of each clip which is used in the edit list, and the system control unit 5 controls the material server 3 so as to preferentially read the high-resolution video/audio data D1 around the edited points of the video/audio part.

Still further, the above-described embodiment has described a case where an operator performs cut editing as rough editing and creates an EDL as a first edit list specifying the details of the cut editing, by using a proxy editing terminal device $8_1$ to $8_n$. This invention, however, is not limited to this and simple video special effects in addition to the cut editing can be set as the rough editing and further, a first edit list specifying the details of such rough editing can be created with the proxy editing terminal device $8_1$ to $8_n$.

Still further, the above-described embodiment has described a case where an editing terminal device $9_1$ to $9_n$ creates a final edit list as a second edit list specifying the edit details of the actual editing in a manner that an operator performs cut editing, setting of special effects and audio mixing and insertion of a title as the actual editing. This invention, however, is not limited to this and other editing processes can be set as the actual editing in addition to the cut editing, the setting of the special effects and audio mixing, and the insertion of a title, and a second edit list specifying the details of such actual editing may be created with the editing terminal device $9_1$ to $9_n$.

Still further, the above-described embodiment has described a case where the on-air system 1 is constructed of the material server 3 as a first storage and retaining means, the down-converter 4 and proxy server 6 as second storage and retaining means, the proxy editing terminal devices $8_1$ to $8_n$ as first edit list creation means, and the editing terminal devices $9_1$ to $9_n$ as second edit list creation means. This invention, however, is not limited to this and the on-air system 1 can be constructed of other kinds of first storage and retaining means, second storage and retaining means, first edit list creation means, and second edit list creation means.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An editing system comprising:
   first storage and retaining means for storing and retaining high-resolution video data of edit material;
   second storage and retaining means for storing and retaining low-resolution video data of said edit material;
   first edit list creation means for creating a first edit list specifying edit details of rough editing by using said low-resolution video data;
   second edit list creation means for creating a second edit list specifying edit details of actual editing by using said high-resolution video data; and
   a network for connecting said first edit list creation means and said second edit list creation means,
   wherein when the second edit list creation means imports a first edit list from the first edit list creation means, high-resolution video data associated with the imported first edit list is automatically read out of the first storage and retaining means, and a first part of the high-resolution data on an IN-point side and a second part of the high-resolution data on a OUT-point side are read out before a rest part of the high-resolution data so that the high-resolution data on the IN-point side and on the OUT-point side are displayed after the first edit list is imported; and
   wherein said second edit list creation means reads said first edit list from said first edit list creation means via said network and creates said second edit list based on the first edit list.

2. The editing system according to claim 1,
   wherein said second edit list creation means makes said first storage and retaining means automatically read high-resolution video data corresponding to said low-resolution video data when reading said first edit list.

3. The editing system according to claim 1,
   wherein said second edit list creation means makes said first storage and retaining means preferentially read high resolution video data around edited points of said edit material out of said high-resolution video data.

4. The editing system according to claim 2,
   wherein said high-resolution video data automatically read from said first storage and retaining means is written in third storage and retaining means.

5. The editing system according to claim 3,
   wherein said high-resolution video data preferentially read from said first storage and retaining means is written in third storage and retaining means.

6. The editing system according to claim 2,
   wherein said second edit list creation means makes said first storage and retaining means preferentially read high-resolution video data around edited points of said edit material out of said high-resolution video data.

7. The editing system according to claim 6,
   wherein said high-resolution video data preferentially read from said first storage and retaining means is written in third storage and retaining means.

8. A control method of an editing system, comprising:
   a first step of storing high-resolution video data of edit material in first storage and retaining means;
   a second step of storing low-resolution video data of said edit material in second storage and retaining means;
   a third step of creating a first edit list specifying edit details of rough editing by using said low-resolution video data in first edit list creation means; and
   a fourth step of reading said first edit list from said first edit list creation means via a network, and creating a second edit list specifying edit details of actual editing by using said high-resolution video data based on the first edit list in second edit list creation means,
   wherein when the second edit list creation means imports a first edit list from the first edit list creation means, high-resolution video data associated with the imported first edit list is automatically read out of the first storage and retaining means, and a first part of the high-resolution data on an IN-point side and a second part of the high-resolution data on a OUT-point side are read out before a rest part of the high-resolution data so that the high-resolution data on the IN-point side and on the OUT-point side are displayed after the first edit list is imported.

9. The control method according to claim 8,
   wherein said fourth step makes said first storage and retaining means automatically read high-resolution video data corresponding to said low-resolution video data when reading said first edit list.

10. The control method according to claim 8,
    wherein said fourth step makes said first storage and retaining means preferentially read high-resolution video data around edited points of said edit material out of said high-resolution video data.

11. The control method according to claim 9,
    wherein said high resolution video data automatically read from said first storage and retaining means is written in third storage and retaining means.

12. The control method according to claim 10,
    wherein said high-resolution video data preferentially read from said first storage and retaining means is written in third storage and retaining means.

13. The control method according to claim 9,
    wherein said fourth step makes said first storage and retaining means preferentially read high-resolution video data around edited points of said edit material out of said high resolution video data.

14. The control method according to claim 13,
    wherein said high-resolution video data preferentially read from said first storage and retaining means is written in third storage and retaining means.

* * * * *